United States Patent [19]

Jansen

[11] Patent Number: 4,872,200

[45] Date of Patent: Oct. 3, 1989

[54] SYSTEM OF ORTHOGONAL CODE GENERATORS, RADIOS PROVIDED WITH A CODE GENERATOR AND CODE GENERATORS OF SUCH A SYSTEM

[75] Inventor: Cornelis J. A. Jansen, Best, Netherlands

[73] Assignee: Hollandse Signaalapparaten B.V., Hengelo, Netherlands

[21] Appl. No.: 181,879

[22] Filed: Apr. 15, 1988

[30] Foreign Application Priority Data

Apr. 17, 1987 [NL] Netherlands ......................... 8700930

[51] Int. Cl.$^4$ .............................................. H04L 9/04
[52] U.S. Cl. ........................................ 380/34; 380/46; 375/1
[58] Field of Search .................. 380/34, 46, 47; 375/1; 364/717; 331/78

[56] References Cited

U.S. PATENT DOCUMENTS

| | | | |
|---|---|---|---|
| 3,920,894 | 11/1975 | Shirley et al. | 364/717 |
| 4,225,935 | 9/1980 | Zscheile, Jr. et al. | 364/717 |
| 4,308,617 | 12/1981 | German, Jr. | 375/1 |
| 4,341,925 | 7/1982 | Doland | 364/717 |
| 4,667,301 | 5/1987 | Chiu et al. | 380/46 |
| 4,685,132 | 8/1987 | Bishop et al. | 380/46 |
| 4,694,412 | 9/1987 | Domenik et al. | 364/717 |

FOREIGN PATENT DOCUMENTS

| | | | |
|---|---|---|---|
| 921059 | 4/1982 | U.S.S.R. | 364/717 |
| 947856 | 7/1982 | U.S.S.R. | 364/717 |

*Primary Examiner*—Salvatore Cangialosi
*Attorney, Agent, or Firm*—Emmanuel J. Lobato

[57] ABSTRACT

System of orthogonal code generators, where a first code generator (1) generates a code sequence from a running counter reading (2) which sequence is different from the code generated by a second code generator (1') directed by the same counter reading. Each code generator comprises a number of individually arranged and counter-reading directed subcode generators (3.i), each generating a subcode ($g_i$) together representing the code, where at least one subcode generator 3.i of the first code generator (1) generates a subcode ($g_i$) which is different from the subcode $g_i'$ of the similarly arranged subcode generator (3.i') of the second code generator (1').

14 Claims, 8 Drawing Sheets

SYSTEM OF ORTHOGONAL CODE GENERATORS, RADIOS PROVIDED WITH A CODE GENERATOR AND CODE GENERATORS OF SUCH A SYSTEM

BACKGROUND OF THE INVENTION

The invention relates to a system of orthogonal code generators, where a first code generator generates a code sequence from a running counter reading which sequence is different from the code sequence generated by a second code generator, directed by the same counter reading;

The invention also relates to a code generator suitable for use in a system as described above and to a radio provided with a code generator, where the output signals of the code generator are supplied to a memory for addressing memory positions where a memory position comprises a frequency-representing value, which is supplied to a transmitting and receiving unit to tune this unit to the last-mentioned frequency value.

Such a system is known from EP-A 0,189,695. It relates particularly to a system for radio communication. In this system a radio generates a sequence of frequencies on which the radio transmits or receives. For this purpose, a radio is provided with a pseudo-random generator of which the running counter reading is supplied to a code generator also belonging to the radio. It is hereby presumed that the radios are provided with mutually synchronised counter position generators. For the synchronisation of the counter reading generators (also called time-of-day counters), reference is made to EP-A 0,235,869. From a running counter reading a code generator generates a code sequence. For this purpose it is conceivable that such a code addresses a conversion table (memory), causing the code to be converted to a frequency. Such a conversion table will therefore usually be a one-to-one projection. If the code sequences of a number of radios are identical and synchronous, communication among these radios is possible. A set of such radios is called a "net". It is often desirable that several nets (code generators) of radios exist, generating different code sequences to render communication among the nets impossible. Such a system is known from EP-A 0,189,695. If it should moreover be required that such nets do not cause mutual interference, the code sequences should not generate the same codes at any moment. The nets thus generate mutually orthogonal code sequences. It is important for communication that, if the code sequence of the first net is known, the code sequence of other nets are as little known as possible to reduce the effects of jamming to a minimum. This implies that the mutual correlation of the orthogonal code sequences must be as little as possible, while the whole net system must contain sufficient correlation to guarantee that all nets generate mutually orthogonal sequences.

A code generator as mentioned in this description, in the case of radio communication, equivalent to a net of radios (code generators) which synchronously generate the same code sequence. All radios of the same net are provided with code generators generating the same code. Two orthogonal code generators are therefore equivalent to two orthogonal nets of code generators.

The above-mentioned application EP-A 0,189,695 has the disadvantage that not all nets generate orthogonal code sequences.

SUMMARY OF THE INVENTION

The present invention does not have this disadvantage and is characterised in that a code generator consists of a number of individually arranged and counter-reading directed subcode generators, each generating a subcode together representing the code, where at least one subcode generator of the first code generator generates a subcode which is different from the subcode of the similarly arranged subcode generator of the second code generator.

A system in accordance with the invention also has the advantage that an extremely complex system of orthogonal code generators (orthogonal nets of radios) can be realised in a simple way. Compromise of a first code generator has minimal consequences for co-compromise of other code generators (other nets of radios). Moreover, an existing system can easily be extended or rearranged, without deteriorating the orthogonal operation of the code generators.

A special embodiment of a system of orthogonal code generators is characterised in that a code generator consists of n subcode generators i ($i=1, 2, \ldots, n$), where a subcode generator i subsequently generates subcode-representing numbers $g_i$, where $g_i \leq N_i - 1$ and $N_i$ represents a fixed value, where a subcode generator consists of a pseudo-random generator and an adder unit, the pseudo-random generator generating from the running counter reading and directed by a key, a pseudo-random sequence of numbers which are supplied to the adder unit, and the adder unit adding a number $A_i$ modulo $N_i$ to the second-last mentioned numbers to obtain the numbers $g_i$.

If a code generator according to the invention is applied in a frequency-hopping radio, where the code generator addresses the above-mentioned memory table (conversion table) to obtain the frequency to be used, a radio in the embodiment according to the invention is very advantageous as regards jamming occurring in cosite situations. If orthogonally operating radios are geographically situated in each other's vicinity, they may jam each other if they use frequencies which, although not the same, lie very close together. In combination with the code generator, the memory can be arranged in such a way that only very few radios can jam each other. According to the invention, the memory is built up of $N_1 \times N_2 \times \ldots \times N_n = Q$ memory positions, comprising respectively the frequency values $f_1^1, f_2^1, \ldots, f_{Q/N_1}^1, f_1^2, f_2^2, \ldots, f_{Q/N_1}^2, \ldots f_1^{N_1}, f_2^{N_1}, \ldots, f_{Q/N_1}^{N_1}$, where $$f_1 + (j-1)\frac{f_h - f_1}{N_1} < f^j < f_1 + j \cdot \frac{f_h - f_1}{N_1}$$

and $i=1, 2, \ldots, Q/N_1$, $j=1, 2, \ldots, N_1$.

A specially advantageous embodiment according to the invention consists in that the memory contains $N_1 \times N_2 \times \ldots \times N_n = Q$ memory positions, comprising respectively the frequency values $$f_1^1, f_2^1, \ldots, f_{k_2}^1, f_1^2, f_2^2, \ldots, f_{k_2}^2, \ldots, f_1^{Q/k_1k_2},$$
$$f_2^{Q/k_1k_2}, \ldots, f_{k_2}^{Q/1k_2k},$$
$$f_{1+k_2}^1, f_{2+k_2}^1, \ldots, f_{2k_2}^1, f_{1+k_2}^2, f_{2+k_2}^2, \ldots, f_{2k_2}^2, \ldots, f_{1+k_2}^{Q/k_1k_2},$$
$$f_{2+k_2}^{Q/k_1k_2}, \ldots, f_{2k_2}^{Q/k_1k_2},$$
$$f_{1+2k_2}^1, f_{2+2k_2}^1, \ldots, f_{3k_2}^1, f_{1+2k_2}^2, f_{2+2k_2}^2, \ldots, f_{3k_2}^2, \ldots, f_{1+2k_2}^{Q/k_1k_2},$$

-continued $$f_{2+2k_2}^{Q/k_1k_2}, \ldots, f_{3k_2}^{Q/k_1k_2},$$

$$f_{1+(k_1-1)k_2}^1, f_{2+(k_1-1)k_2}^1, \ldots, f_{k_1k_2}^1, f_{1+(k_1-1)k_2}^2, f_{2+(k_1-1)k_2}^2, \ldots,$$
$$f_{k_1k_2}^2, \ldots, f_{1+(k_1-1)k_2}^{Q/k_1k_2}, f_{2+(k_1-1)k_2}^{Q/k_1k_2}, \ldots, f_{k_1k_2}^{Q/k_1k_2}$$

where $t|f_i^j - f_{i'}^j| \geq \Delta.f_i^j$ ($j=1, 2, \ldots, Q/k_1k_2$; $i, i'=1, 2, \ldots,$ $k_1k_2 \wedge i \neq i'$; $\Delta > 0$; $k_1k_2 \in N^+$) and $f_i^j \neq f_i^{j'}$ if $i \neq i'$ of $j \neq j'$.

A radio now proves on theoretical grounds to be arranged in such a way that a maximum number of radios can operate together without jamming in a cosite situation.

BRIEF DESCRIPTION OF THE DRAWING

The invention will be further explained with reference to the accompanying figures, of which

DETAILED DESCRIPTION OF THE INVENTION

Figure 1:
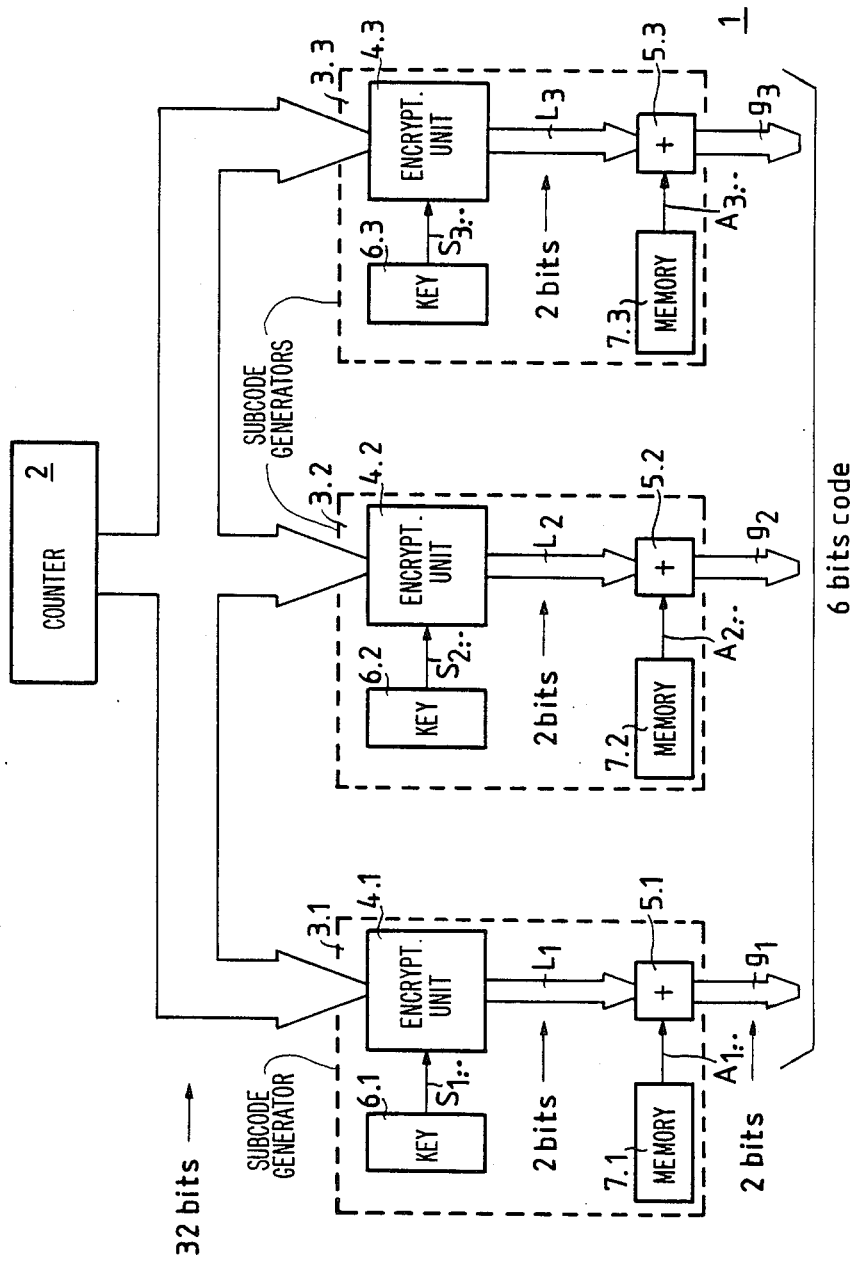
FIG. 1 shows a simple embodiment of a code generator according to the invention.

Reference number 1 in FIG. 1 indicates a very simple embodiment of a code generator forming part of a system of orthogonal code generators, according to the invention. The code generator is provided with a 32-bit counter reading generator 2, generating a 32-bit running counter reading. Furthermore, the code generator is provided with three subcode generators 3.i (i=1, 2 or 3). From the running counter reading, an $i^{th}$ subcode generator 3.i generates a radix q number of $a_i$ digit positions. In this example it is assumed, without restricting the scope of claims, that $q=a_i=2$. Each subcode generator therefore generates a 2-bit subcode (number) $g_i$ (i=1, 2 or 3). The range of a subcode generator is therefore [0, $N_i-1$] where $N_i=4$. The three subcodes $g_i$ together form a 6-bit code, as indicated in FIG. 1. A subcode generator 3.i consists of encryption unit 4.i (i=1, 2, 3) and a modulo-4 adder unit 5.i. The encryption unit 4.i generates a pseudo-random 2-bit number $L_i$ under direction of an exchangeable key 6.i (i=1, 2, 3). This 2-bit number $L_i$ is supplied to adder unit 5.i. Adder unit 5.i also receives a 2-bit number $A_i$ (i=1, 2, 3). Adder unit 5.i adds 2-bit number $A_i$ modulo 4 to number $L_i$ to obtain subcode $g_i$.

A system of orthogonal codegenerators as described above can only contain a maximum of $$2^{p\overset{3}{=}1} a_p = 2^6 = 64$$

orthogonal code generators, because only 64 different codes can be generated. For this purpose, the 64 code generators should have a distribution of keys and addition numbers $A_i$ according to the invention. Distribution of keys and addition numbers can be as follows: All subcode generators 3.i of the 64 code generators (64 nets) have the same key $S_1$. (One could also say that these subcode generators are of the same type.) A first cluster of 16 code generators exists having an addition number $A_{1,1}$. A second cluster of 16 code generators has a different addition number $A_{1,2}$. Similarly, a third and a fourth cluster of 16 code generators have addition numbers $A_{1,3}$ and $A_{1,4}$ respectively. Because $A_{1,k} \neq A_{1,m}$ (k, m=1, 2, 3, 4 $\wedge$ k$\neq$m), the four clusters generate mutually different codes (the numbers $g_i$ are different).

Figure 2:
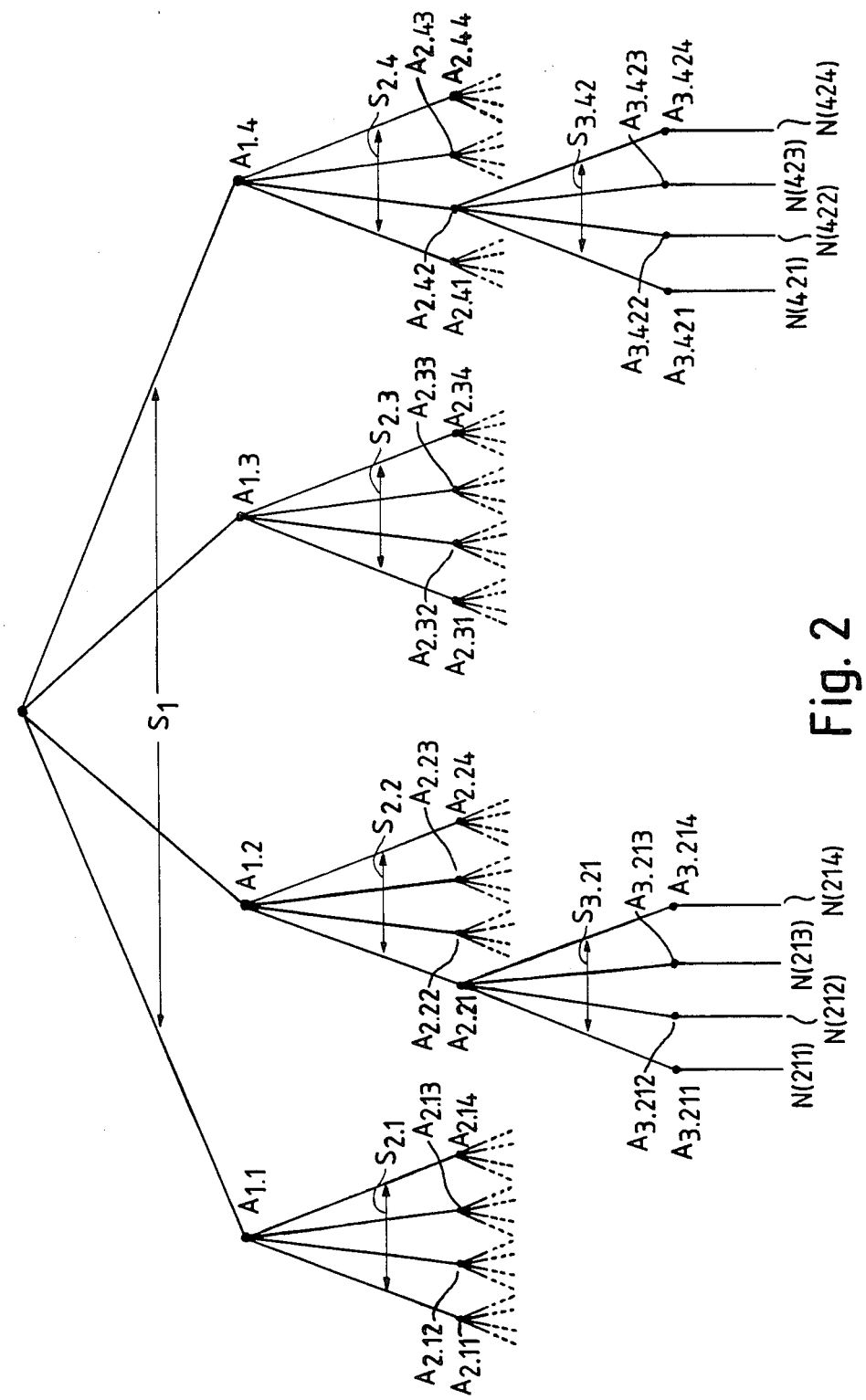
FIG. 2 shows a tree diagram of the division of keys and addition numbers for a system of code generators of FIG. 1.

FIG. 2 indicates by means of a tree diagram how 64 (nets of) code generators R can be distributed over four clusters. Level 1 of the tree diagram indicates the four clusters with the accompanying addition numbers of the first subcode generator. It clearly shows that the first subcode generators effect the quartering (orthogonalisation) at the first level of the tree diagram. The common key $S_1$ of the first subcode generator is indicated above the first level. The first index of a key or addition number corresponds with index i of subcode generator 3.i and the level i to which the key or the addition number in question relates (here i=1, 2 or 3). A subcode generator 3.i will hereinafter be called subcode generator i.

For the orthogonalisation of the code generators within a cluster, a cluster of 16 code generators is subdivided into four subclusters of four code generators. To realise this, measures have to be taken at subcode generators 2 (i=2) of a cluster: the 16 nets of the first cluster have the same key $S_{2.1}$ while four nets of a first subcluster of the first cluster have addition number $A_{2.11}$, four nets of a second subcluster of the first cluster have addition number $A_{2.12}$, etc. Similarly, each of the second, third and fourth clusters are subdivided into four orthogonal subclusters of four code generators.

Because $A_{2.kp} \neq A_{2.kr}$ (k, p, r=1, 2, 3, 4$\wedge$p$\neq$r), nets of a first subcluster of a cluster are orthogonal with nets of a second subcluster of the last-mentioned cluster. Keys $S_{2.i}$ (i=1, 2, 3, 4) do not especially need to be different. In view of safety after compromise however, it is advantageous to make last-mentioned keys mutually independent. The keys, so to say, determine the basic pattern of a code sequence while the addition parts orthogonalise basic patterns. Because nets of a first cluster are also orthogonal with nets of a second cluster, nets of a first subcluster are orthogonal with nets of each second subcluster which is different from the first subcluster.

FIG. 2 shows the second level of the division of clusters into subclusters. It also indicates the different addition numbers of the second subcode generators. The common key of a subcluster is indicated above the second level.

Four code generators within a subcluster are orthogonal as a result of the application of a common key for these four code generators and the application of four different addition numbers in these code generators for subcode generator 3. In this way, the four code generators of the second cluster of the third subcluster receive a common key $S_{3.23}$ and four different addition numbers $A_{3.231}$, $A_{3.232}$, $A_{3.233}$ and $A_{3.234}$ respectively.

FIG. 2 indicates the addition numbers of subcode generators 3 at the third level, while above the third level the common key of the four code generators belonging to one subcluster is indicated.

Because four code generators within a subcluster operate orthogonally as a result of the addition numbers at subcode generators 3, code generators of different subclusters within one cluster operate orthogonally as a result of the addition numbers of subcode generators 2, and code generators of different clusters operate orthogonally as a result of the addition numbers at subcode generators 1, all 64 code generators (or nets of code generators) operate mutually orthogonal.

A code generator according to the above embodiment can be generalised as follows: Per code generator, n subcode generators may be applied, where a subcode generator is provided with a bits. In FIG. 2 this would mean that n levels exist where each junction $2^a$ is branched off and a total of $A = 2^{na}$ code generators exist. There are $1 + 2^a + 2^{2a} + 2^{(n-1)a} = (2^{na} - 1)/(2^a - 1)$ independent keys with $2^a$ different addition numbers per key.

Instead of binary numbers, numbers from a radix q system may be used for the subcode generators. In that case, the addition numbers are added modulo-$q^a$. If the code generator is provided with n subcode generators, where a subcode generator is provided with "a" radix q digit positions, a maximum of $Q = q^{na}$ code generators can operate orthogonally.

There are $$\frac{q^{na} - 1}{q^a - 1}$$

independent keys with $q^a$ different addition numbers per key. It is possible, by means of 2 bits (a=2) to simulate a ternary system (q=3) by only using the numbers 00, 01 and 10 and treating them as numbers. In that case, the addition numbers are added modulo-3.

As an example of a further generalisation, it is also possible that the range of subcode generators i (i=1,..,n) is different within a code generator. The range of subcode generator i is then $N_i$, i.e. subcode generator i generates numbers in the range of [0, $N_i - 1$]. The variation within this range can be realised in different ways: the number of digit positions $a_i$ is a function of i; digit positions of subcode generator i are radix $q_i$, where $q_i$ is a function of i or the full range of a subcode generator i is not used as described above with numbers $g_i = 00, 01$ or 10, where $a_i = 2$. A combination of the three methods mentioned above is also possible.

If, for example, the first and second method are combined, $N_i$ of a subcode generator i can be described: $N_i = q_i^{a_i}$.

If the third method also applies here, $N_i < q_i^{a_i}$.

The maximum number of orthogonal code generators Q is $N_1 \times N_2 \times \ldots \times N_n$. There are $N_1 \times N_2 \times \ldots \times N_{n-1}$ independent keys for subcode generators i with $N_i$ different addition numbers per key.

The total number of independent keys is $1 + N_1 + N_1 \times N_2 + \ldots + + N_1 \times N_2 \times \ldots \times N_{n-1}$.

Figure 3:
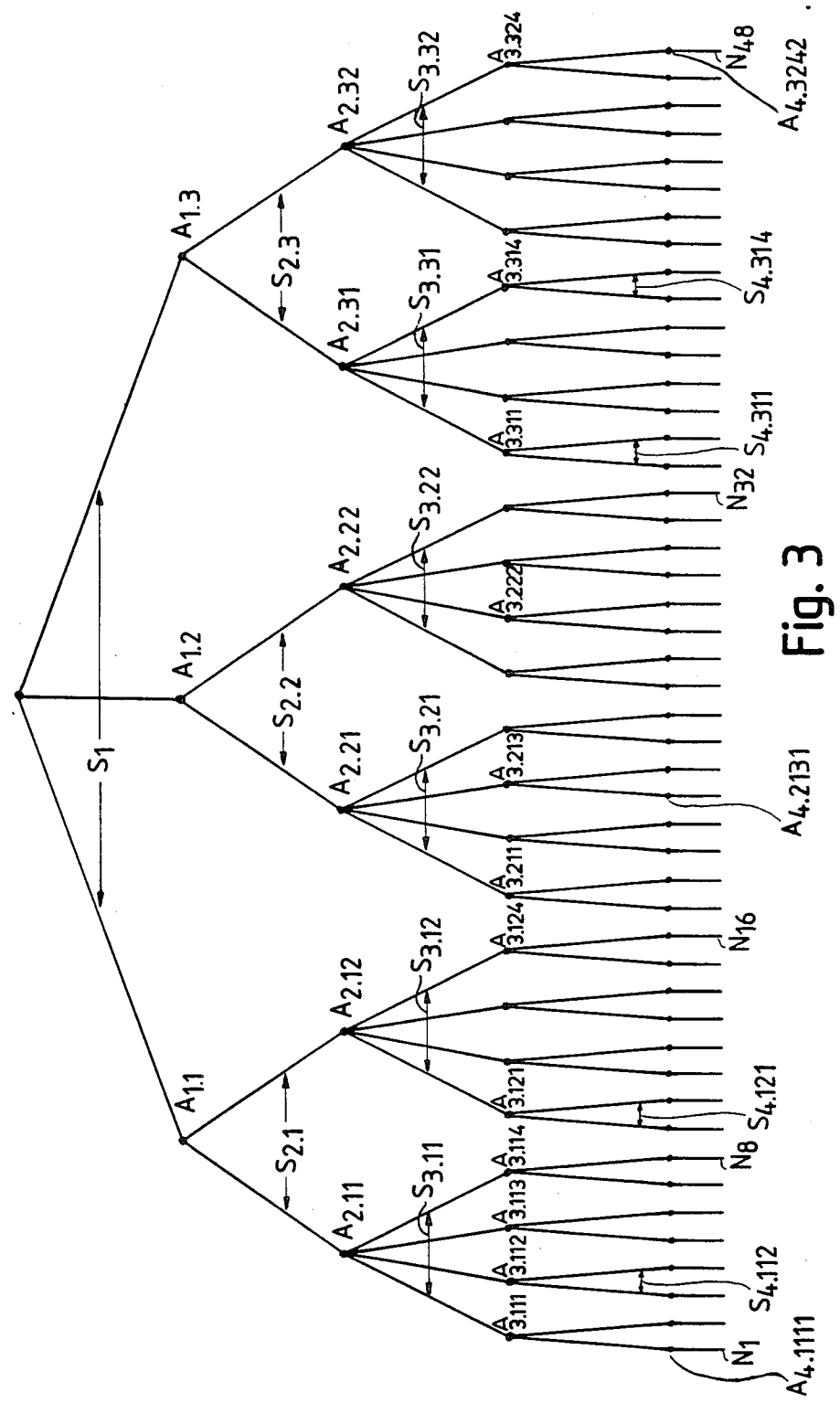
FIG. 3 shows a tree diagram for a possible key and addition number division of a system of 48 orthogonal code generators.

So far it has been assumed for the generalisation of the system of orthogonal code generators, that all (sub)clusters of a level are of the same size, in other words, contain the same amount of code generators. This corresponds with the condition that all subcode generators i have the same range $N_i$. On the basis of the orthogonal codegenerators described above, five independent methods, either in combination or not, can be applied for a further generalisation. Each method should at least be applied to subcode generators i, belonging to the same (sub)cluster and therefore having the same key (of the same type). The five methods will be discussed on the basis of an example. We assume a system of three clusters ($N_1 = 3$), each having two subclusters ($N_2 = 2$), each with four subclusters ($N_3 = 4$) of two code generators each ($N_4 = 2$), see FIG. 3.

Figure 4:
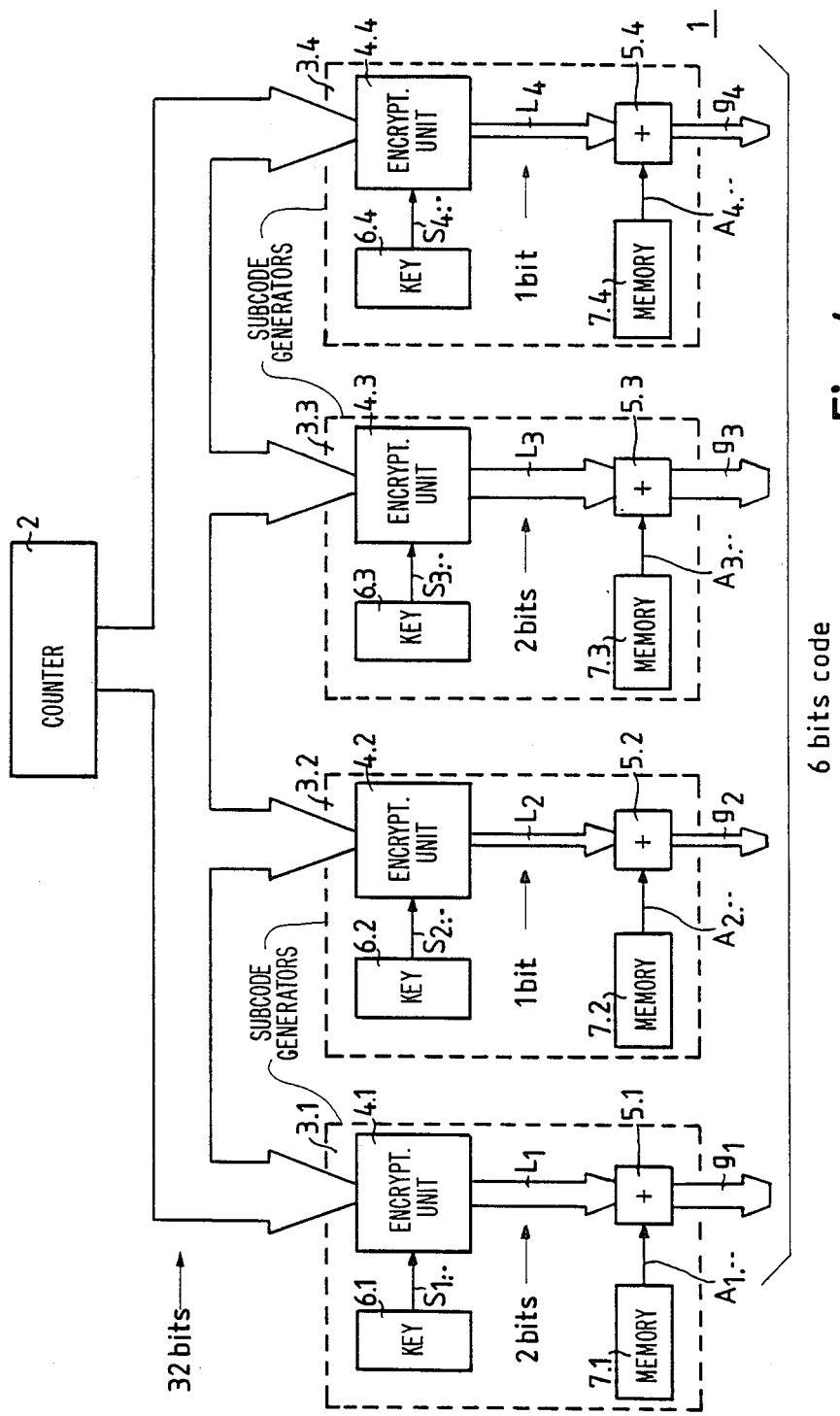
FIG. 4 shows a code generator belonging to the system of FIG. 3.

FIG. 4 shows a possible construction of a code generator of the last-mentioned system of these code generators, where $a_1 = q_1 = 2$. For simplicity's sake, the code generators are numbered with a different notation from $R_1-R_{48}$. For a subcode generator 1, $N_1 = 3$, so that $N_1 < q_1^{a_1}$. This implies that only the numbers $g_1 = 00, 01$ and 10 are used, while addition numbers are added modulo-3. For a subcode generator 2, $N_2 = 2$, so that $N_2 = a_2^{a_2}$ and the numbers $g_2 = 0$ and $g_2 = 1$ are used; addition numbers are added modulo-2. For a subcode generator 3, $N_3 = 4$, so that $N_3 = q^{3a_3}$ and the numbers $g_3 = 00, 01, 10$ and 11 are used; addition numbers are added modulo-4. For a subcode generator 4 the same applies as discussed for subcode generator 2.

Figure 5:
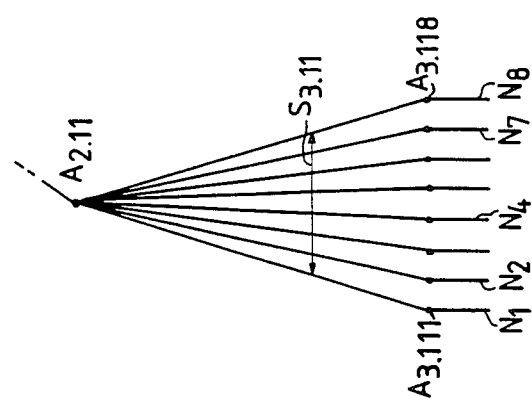
FIG. 5 shows the deletion of a level in the tree diagram of FIG. 3.

A first generalising method is the omission of a level of several (sub)clusters. FIG. 5 shows an example. Here level 4 for a subcluster has been omitted. This is realised by combining two or more subcode generators to form one larger subcode generator at the code generators. Last-mentioned subcode generators are provided with one key and different addition numbers. In this example, subcode generators 3 and 4 of code generators 1–8 are combined to form one subcode generator 3'. Subcode generators 3' are provided with $a_3' = 3$ digit positions, one common key $S_{311}$ and eight mutually different addition numbers ($A_{3.11k}$, $k = 1, 2, \ldots, 8$), which are added modulo-8.

Figure 6:
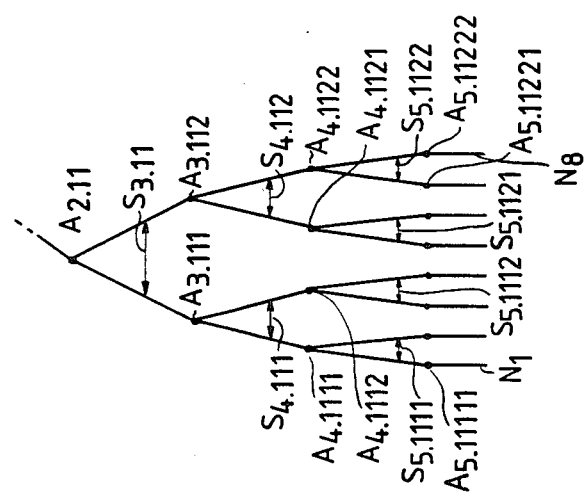
FIG. 6 shows the addition of a level in the tree diagram of FIG. 3.

A second method implies the insertion of a level for several (sub)clusters. FIG. 6 shows an example. One level has been inserted for the subcluster of code generators $R_1-R_8$. This is realised by replacing a number of subcode generators by two or more subcode generators per subcode generator, for the code generators belonging to a (sub)cluster. In this example, subcode generators 3 of the code generators $R_1-R_8$ are replaced by subcode generators 3' and 4'. The subcode generators 3' are provided with the same key $S_{3'.11}$, while subcode generators 4' are provided with a key $S_{4'.111}$ or $S_{4'.112}$, see FIG. 6. Four subcode generators having key $S_{3'.11}$ are provided with the addition number $A_{3'.111}$ and the remaining four subcode generators with key $S_{3'.11}$ are provided with the addition number $A_{3'.112}$. We assume that $A_{3'.111} \neq A_{3'.112}$. Subcode generators 4' of code generators $R_1$ and $R_2$ are provided with addition number $A_{4'.111}$; subcode generators 4' of code generators $R_3$ and $R_4$ are provided with addition number $A_{4'.1112}$, subcode generators 4' of code generators $R_5$ and $R_6$ are provided with addition number $A_{4'.1121}$ and the subcode generators 4' of the code generators $R_7$ and $R_8$ are provided with addition number $A_{4'.1122}$.

We assume that: $A_{4'.1111} \neq A_{4'.1112}$ and $A_{4'.1121} \neq A_{4'.1122}$. Subcode generators 5 of code generators $R_1$ and $R_2$ are provided with a common key $S_{5.1111}$ and two different addition numbers $A_{5.11111}$ and $A_{5.11112}$ respectively.

A third method is the reconfiguration of several (sub)clusters. In this method the distribution of the number of digit positions $a_i$ within a (sub)cluster for subsequent levels i (e.g. i=k, k+1, ..., k+r) is rearranged to a number of digit positions $a_i$ (i=k, k+1, ..., k+r) where the total number of digit positions remains unchanged, in other words:

$$\sum_{i=k}^{k+r} a_i = \sum_{i=k}^{k+r} a_i'.$$

Figure 7:
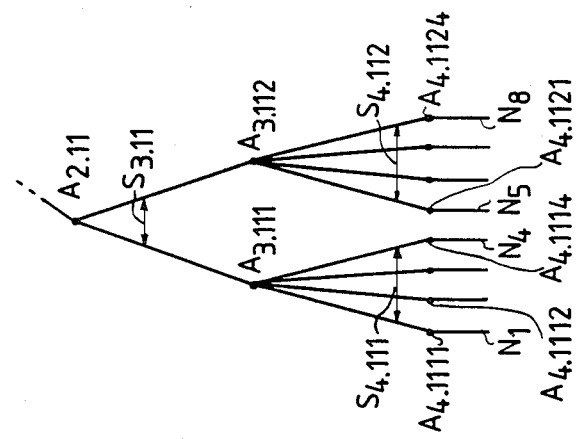
FIG. 7 shows the reconfiguration of a level in the tree diagram of FIG. 3.

FIG. 7 gives an example. In FIG. 7, $a_3'=1$ and $a_4'=2$, so that $a_2+a_3=a_2'+a_3'$. The number of keys at the fourth level is now two instead of four. To each key of the fourth level of code generators ($R_1$-$R_8$) now belong four different addition numbers. The same effect can be achieved by exchanging numbers $g_i$ in the code, e.g. $g_i$ $g_j$ $g_k$ is replaced by $g_j$—$g_k$—$g_i$.

Figure 8:
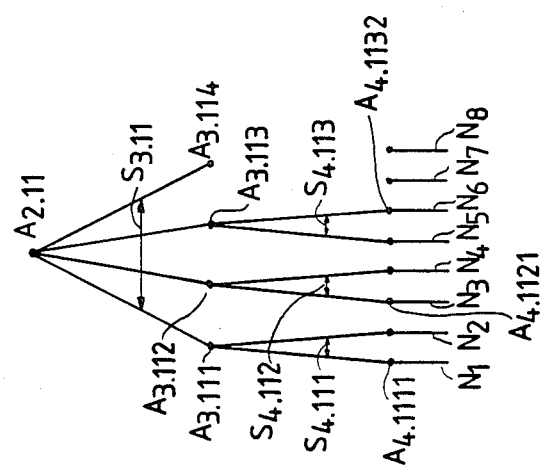
FIG. 8 shows the fixation of a level in the tree diagram of FIG. 3.

A fourth method is the fixation of one or more subcode generators of several code generators. This implies that, for several code generators, the output of one or more subcode generators is fixed or masked by a number. This results in the relevant code generators generating a limited, possibly disjunct, code sequence. FIG. 8 shows an example where subcode generators 4 of code generators 1 and 2 are fixed. In a tree diagram as in FIG. 8, fixation implies in fact that one branch is cut off because the number of orthogonal code generators generating 48 different codes decreases.

A fifth method concerns the extension of subcode generators for several code generators. This can be realised by giving several subcode generators i a wider range $N_i'$, implying that the number of orthogonal code generators in the system can increase. This can also be realised by providing several code generators with an extra subcode generator. These two possibilities will be subsequently described by means of FIG. 9.

Figure 9:
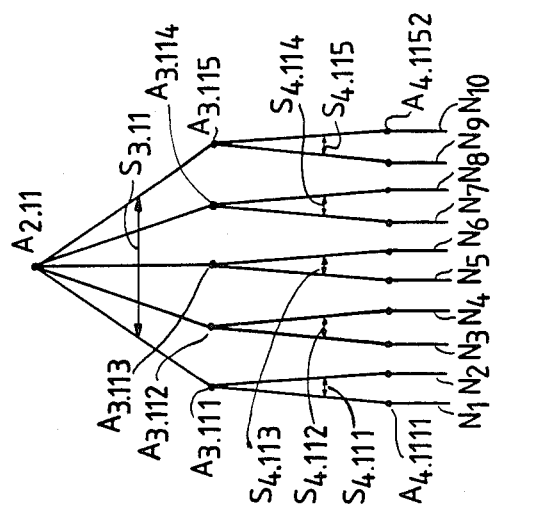
FIG. 9 shows the extension of subcode generators of some code generators in the system according to FIG. 3.

In FIG. 9 two code generators are added. This can be realised by providing subcode generators 3 with an extra digit position, i.e. $a_3'=3$. If q=2, subcode generators 3 have a range $N_3 \leq 2^3$. In this case $N_3=5$, implying that the number of codes to be generated $Q=N_1 \times N_2 \times N_3 \times N_4 = 3 \times 2 \times 5 \times 2 = 60$. This implies that the system can consist of a maximum of 60 orthogonal code generators. However, for 10 code generators the fourth subcode generators are fixed, implying that the system effectively includes 50 orthogonal code generators, generating 60 different codes. So, two generators having a key $S_{312}$, $S_{321}$, $S_{322}$, $S_{331}$ and $S_{332}$ respectively, qualify for fixation, so that at each of the accompanying subclusters a branch of the accompanying tree diagram is omitted. Only the subcluster with key $S_{311}$ is therefore provided with a fifth branch.

Corresponding with the second possibility for the fifth method, the codegenerators with key $S_{311}$ are provided with an extra subcode generator having a range of N=2. This implies that the system can generate 50 different codes, so that 50 orthogonal code generators can be realised. Only the subcluster with key $S_{311}$ is therefore provided with a fifth branch. The difference with the first possibility is particularly clear from the number of different codes generated: according to the first possibility 60 different codes are generated, while 50 orthogonal code generators are present, according to the second possibility 50 different codes are generated, while 50 orthogonal code generators are present.

It will be clear that it is possible to combine all of the above-mentioned methods to obtain an extremely complex system of orthogonal code generators.

A special application of orthogonal code generators in a system of frequency hopping radios will be discussed below.

Hopping nets of radios are often confronted with cosite problems. This implies that (hopping) nets of radios jam each other, if they operate geographically close together. This jamming can also occur in orthogonally hopping nets of radios, because the frequencies used by the radios, although different, are close together causing garbling. To prevent cosite problems in frequency hopping radio nets, care should be taken that the frequencies are not only different but also that they are separated by a certain relative or absolute frequency distance. Radios which are provided with a code generator according to the invention can be made quite insensitive to cosite problems due to the structure of the system of code generator with accompanying key and addition number distribution.

Figure 10:
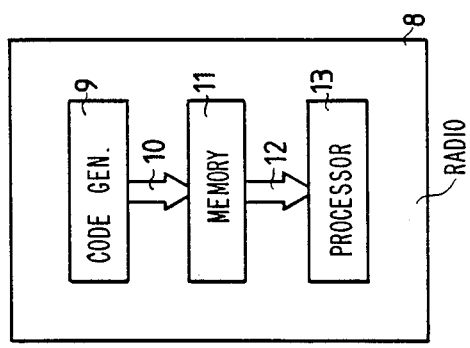
FIG. 10 shows a radio provided with a subcode generator.

FIG. 10 shows a radio 8 which is provided with a code generator 9 according to the invention. The codes generated by code generator 9 are supplied to a memory 11 via line 10. In this case, the code functions as an addressing system and selects a memory position in memory 11. The contents of a memory position consist of a binary number indicating a frequency value. If there are Q orthogonally hopping (nets of) radios, the radios must be capable of generating at least Q different frequencies. This implies that a code generator usually generates Q different codes and that a memory 11, supplied with Q different codes, generates Q different frequency values. Two different codes are therefore accompanied by two different frequency values. In the radio, the frequency values generated by memory 11 are supplied to a unit 13 via line 12 for further processing.

Unit 13 comprises known means for the generation, modulation, reception and demodulation of a transmitting signal.

To prevent cosite problems, memory 11 is filled with Q different frequency values in a special way. For this purpose, use is made of the structure of the system of code generators described above. All radios belonging to one net are provided with a code generator having the same key and addition numbers. All radios are provided with a memory 11 having identical contents.

A first possibility according to the invention to fill memory 11 is described below.

Figure 11:
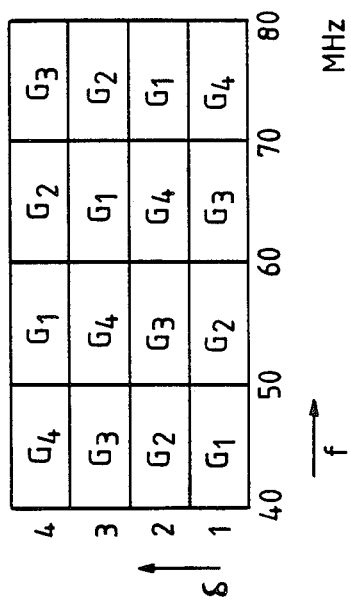
FIG. 11 shows possible divisions of clusters of radios over a frequency interval.

We assume that the frequencies to be used have to be within an interval with $f_l$ as the lowest frequency and $f_h$ as the highest frequency. The bandwidth $B=f_h-f_l$. The memory positions are filled with Q frequency values which linearly increase in steps of $\Delta f=B/Q$. This implies that clusters with addition numbers $A_{1.1}$, $A_{1.3}$, $A_{1.5}$, ... always have a minimum frequency distance of $\Delta B = B/N_1$. This is also true for clusters with addition numbers $A_{1,2}, A_{1,4}, A_{1,6}, \ldots$. A proper selection of B and $N_1$ can therefore prevent cosite problems among radios of such clusters. However, radios within a cluster and radios of neighbouring clusters can still be confronted with cosite problems. FIGS. 1, 2 and 11 illustrate an example.

We assume a net of Q=64 radios provided with a code generator as shown in FIG. 1. The key and addition number distribution is as shown in FIG. 2. It appears from FIG. 2 that $N_1=4$. the 16 radios with addition number $A_{1,1}$ form a cluster $G_1$. Radios with addition number $A_{1,g}$ form a cluster $G_g$ (g=1,2,3 or 4). We assum that $f_h=80$ MHz and $f_l=40$ MHz. The bandwidth $\Delta B$ of a cluster of radios is therefore always 10 MHz. FIG. 11 clearly illustrates the situation. At $t_{=t0}$, all radios having addition number $A_{1,1}$ (cluster $G_1$) have a frequency which is higher than 40 MHz and lower than 50 MHz (condition $\delta=1$ of FIG. 11). As a result of the linear arrangement of memory 11, all radios having addition number $A_{1,2}$ (cluster $G_2$) have a frequency which is higher than 50 MHz and lower than 60 MHz. Radios from clusters $G_3$ and $G_4$ have frequencies between 60 and 70 MHz and 70 and 80 MHz respectively. There is therefore always a minimum frequency distance of 10 MHz between radios of clusters $G_1$ and $G_3$. This is also true for the radios belonging to clusters $G_2$ and $G_4$. Assume that the radios generate a new frequency each $\Delta t$ sec (hop frequency=$\Delta t^{-1}$), usually at $t=t_0+\Delta t$ condition $\delta$ will have changed: subcode generators 4.1 generate a different subcode, causing clusters $G_1$-$G_4$ to be distributed differently over frequency band B (e.g. condition $\delta=2$ of FIG. 11). FIG. 11 indicates that four distributions (conditions $\delta$) are possible, corresponding with the range of subcode generators 4.1. FIG. 11 clearly shows that the 12 nets of radios of cluster $G_1$ always have a minimum frequency distance of 10 MHz away from the 12 nets of radios of cluster $G_3$. This is also true for the 12 nets of radios belonging to cluster $G_2$ and cluster $G_4$ respectively. The maximum number of clusters of radios C that can operate without cosite problems is therefore 2 ($G_1$, $G_3$ and $G_2$, $G_4$), where we assume that a frequency distance of 10 MHz is sufficient for a cosite situation without jamming. Within a cluster of 12 nets of radios, the frequency distance is lower than 10 MHz, so jamming cannot be prevented.

It is also possible that the bandwidth $\Delta B=B/N_1$ is not sufficient to prevent jamming between radios of cluster $G_1$ and radios of cluster $G_3$. In that case, for example only radios of cluster $G_1$ and $G_4$ can operate in a cosite situation in condition $\delta=1$. In condition $\delta=2$ this will be $G_2$ and $G_1$. The maximum number of clusters of radios capable of operating without jamming in a cosite situation is therefore two (C=2). The number of radios capable of operating without jamming in a cosite situation has however decreased by a factor two. If the minimum required bandwidth $\Delta b=B/7$, it can be proved that C=4 if $N_1=8$. Under the same conditions, i.e. the minimum bandwidth $\Delta b$ for a jamming-free cosite situation is B/7, C=8 if $N_1=56$ ($\Delta B=B/56$). This implies that when the number of clusters of radios increases, the number of clusters of radios capable of operating without jamming in a cosite situation increases. However, the $C/N_1$ ratio decreases when $N_1$ increases: a relatively lower amount of clusters of radios can operate without jamming in a cosite situation when the number of clusters of radios increases. For this reason a sufficiently high value should be selected for B. If B is sufficiently high, it will be possible to select $\Delta b=\Delta B=B/N_1$ as described above. This enables clusters $G_i$ (i=1, 3, 5, ...) to operate without jamming in a cosite situation and clusters of radios $G_i$ (i=2,4,6, ...) to operate without jamming in a cosite situation as well. In this case it will not be necessary that, within a cluster of radios, the frequencies are linearly arranged in memory 11. Only a frequency relation between the clusters of radios is required. A memory with contents in which a cluster does not need linear arrangement, while among clusters a linear arrangement exists, can be described as follows: the $N_1 \times N_2 \times \ldots \times N_n = Q$ memory positions comprise respectively the frequency values $$f_1^1, f_2^1, \ldots, f_{Q/N_1}^1, f_1^2, f_2^2, \ldots, f_{Q/N_1}^2, \ldots, f_1^1, f_2^1, \ldots,$$

$$f_{Q/N_1}^{N_1}, \text{ where } f_1 + (j-1)\frac{f_h - f_1}{N_1} < f_i^j < f_1 + j \cdot \frac{f_h - f_1}{N_1} \text{ and}$$

$$i = 1, 2, \ldots, Q/N_1, j = 1, 2, \ldots, N_1.$$

According to a second method to minimise cosite problems, a minimum relative frequency distance (in terms of percentages) is realised between the frequencies to be used. Within the frequency interval B where $f_l < B < f_h$, a number of frequency sets j is selected. A frequency set j consists of k frequencies $f_i^j$ (i=1, 2, ..., k). The two neighbouring frequencies $f_i^j$ and $f_{i+1}^j$ must be at least $\Delta \times 100\%$ apart in frequency distance:

$$f_{i+1}^j - f_i^j \geq \Delta \cdot f_{i+1}^j (i=1,2,\ldots,k) \quad (1)$$

From formula (1) it follows that $$f_k^j \geq f_1^j (1-\Delta)^k \quad (2)$$

From formula (2) it follows, with $f_h = f_k$ and $f_l = f_1$:

$$k \leq \left| \frac{\log f_h - \log f_1}{\log (1-\Delta)} \right| \quad (3)$$

The value of k is therefore always selected in such a way that it can be resolved into at least two factors $k_1$ and $k_2$. A requirement for $k_1$ and $k_2$ is therefore:

$$k_1 k_2 \leq \left| \frac{\log f_h - \log f_1}{\log (1-\Delta)} \right|$$

where $k_1$ and $k_2$ must be integers and $k_1 \leq k_2$.

The value $N_1$ of the code generators is selected to be equal to $k_1$ (the smallest factor), while the factor $N_n$ is selected to be equal to $k_2$. In a tree diagram as shown in FIG. 2, this would mean that, at the first level, $k_1$ clusters are present while at the highest level $k_2$ subclusters per subcluster are present. Before we proceed to general statements, an example is given of how the frequencies $f_i^j$ are stored in memory 11.

Figure 12:
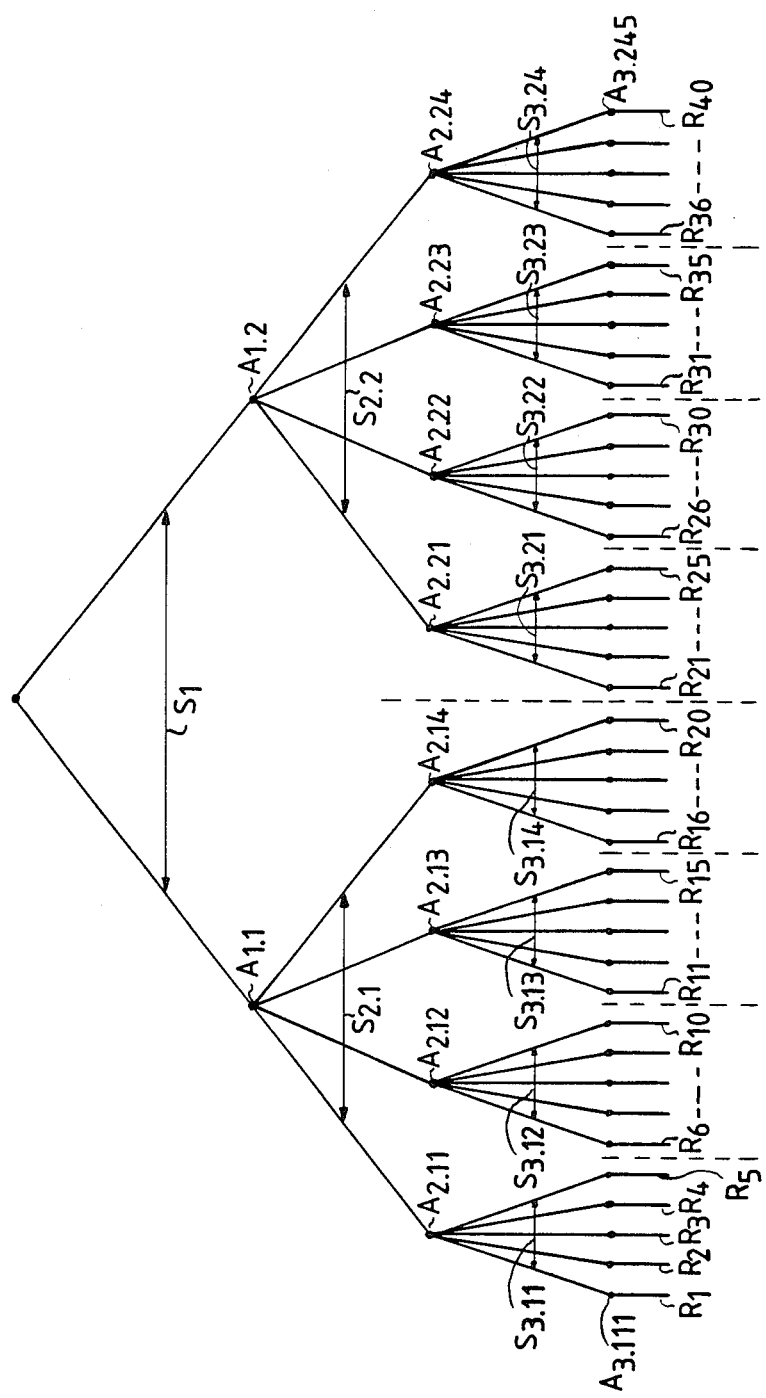
FIG. 12 shows a tree diagram according to the invention to achieve an optimal cosite situation.

Assume that $f_h=87,5$ MHz, $f_l=30$ MHz and $\Delta=0,1$. It follows from formula (4) that $k_1 k_2=10$ can be selected, so that $k_1=2$ and $k_2=5$ will be a solution. As a result $N_1=2$ and $N_n=5$. The other parameters, i.e. $N_2$, ..., $N_{n-1}$ can still be selected freely. So are all the addition numbers and keys. Assume that n=3 and $N_2=4$. This will create a system as shown in FIG. 12.

For the number of frequencies Q to be generated applies: $Q=N_1 \times N_2 \times N_3 = 40$. Within the frequency interval in question, a set j of frequencies $f_i^j$ exists, of which two subsequent frequencies $f_i^j$ and $f_{i+1}^j$ have a relative distance of 10% from a maximum of k=10 frequencies $f_i^j$, i.e. $1 \leq i \leq 10$. Q/k=4 of these sets are selected, i.e. $1 \leq j \leq 4$:

a first set: $f_1^1, f_2^1, \ldots, f_{10}^1$;
a second set: $f_1^2, f_2^2, \ldots, f_{10}^2$;
a third set: $f_1^3, f_2^3, \ldots, f_{10}^3$;
a fourth set: $f_1^4, f_2^4, \ldots, f_{10}^4$.

In the above $|f_i^j - f_{i+1}^j| \geq 0,1 \, f_{i+1}^j$ for $1 \leq i \leq 9$ and $1 \leq j \leq 4$. It also applies that $f_i^j \neq f_{i'}^{j'}$ if $i \neq i'$ or $j \neq j'$.

The frequencies of a first set can however be very close to the frequencies of a second set, i.e. it is possible that $f_2^1 \approx f_2^2$. The memory positions of the memory have the following contents:

$f_1^1, f_2^1 \ldots f_5^1, f_{12} \ldots f_5^2, f_1^3 \ldots f_5^3, f_1^4 \ldots f_5^4, f_6^1 \ldots f_{10}^1, R_1, R_2 \ldots R_5, R_6 \ldots R_{10}, R_{11} \ldots R_{15}, R_{16} \ldots R_{20}, R_{21} \ldots R_{25}, f_6^2 \ldots f_{10}^2, f_6^3 \ldots f_{10}^3, f_6^4 \ldots f_{10}^4 \, R_{26} \ldots R_{30}, R_{31} \ldots R_{35}, R_{36} \ldots R_{40}$.

$R_1$–$R_{40}$ indicate the 40 (nets of) radios which, at a certain point in time, make use of the frequency indicated above during a so-called hop period. It appears that $R_1$–$R_5$ are capable of operating without jamming in cosite because of the 10% frequency distance. (It is assumed that a frequency distance of 10% is sufficient to enable operation without jamming in cosite.) This is also true for $R_6$–$R_{10}$; $R_{11}$–$R_{15}$; $R_{16}$–$R_{20}$; $R_{21}$–$R_{25}$; $R_{26}$–$R_{30}$; $R_{31}$–$R_{35}$ and $R_{36}$–$R_{40}$. However, $R_i$ (i=1–20) and $R_j$ (j=21–40) are capable of operating practically without jamming in a cosite situation. It may happen that $R_{20}$ and $R_{21}$ jam each other because the relative frequency distance between $F_6^1$ and $f_5^4$ is less than 10%. It also appears that the maximum number of (nets of) radios capable of operating without jamming in cosite is k (=10): for example radios $R_1$–$R_5$ and $R_{36}$–$R_{40}$ can operate without jamming in cosite. It is possible to prove that according to the above method, the maximum number of nets in cosite without jamming is as high as possible.

Using the same notation as described above, the general contents of memory 11 can as a generalisation be recorded as follows:

$$f_1^1, f_2^1, \ldots, f_{k_2}^1, f_1^2, f_2^2, \ldots, f_{k_2}^2, \ldots, f_1^{Q/k_1k_2},$$
$$f_2^{Q/k_1k_2}, \ldots, f_{k_2}^{Q/k_1k_2},$$

$$f_{1+k_2}^1, f_{2+k_2}^1, \ldots, f_{2k_2}^1, f_{1+k_2}^2, f_{2+k_2}^2, \ldots, f_{2k_2}^2, \ldots, f_{1+k_2}^{Q/k_1k_2},$$
$$f_{2+k_2}^{Q/k_1k_2}, \ldots, f_{2k_2}^{Q/k_1k_2},$$

$$f_{1+2k_2}^1, f_{2+2k_2}^1, \ldots, f_{3k_2}^1, f_{1+2k_2}^2, f_{2+2k_2}^2, \ldots, f_{3k_2}^2, \ldots, f_{1+2k_2}^{Q/k_1k_2},$$
$$f_{2+2k_2}^{Q/k_1k_2}, \ldots, f_{3k_2}^{Q/k_1k_2},$$

⋮

$$f_{1+(k_1-1)k_2}^1, f_{2+(k_1-1)k_2}^1, \ldots, f_{k_1k_2}^1, f_{1+(k_1-1)k_2}^2, f_{2+(k_1-1)k_2}^2, \ldots,$$
$$f_{k_1k_2}^2, \ldots, f_{1+(k_1-1)k_2}^{Q/k_1k_2}, f_{2+(k_1-1)k_2}^{Q/k_1k_2}, \ldots, f_{k_1k_2}^{Q/k_1k_2}$$

In the above $|f_i^j - f_{i'}^j| \geq \Delta \cdot f_i^j$ (j = 1, 2, ..., Q/k_1k_2; i, i' = 1, 2, ..., k_1k_2 \wedge i \neq i'; \Delta > 0; k_1k_2 \in N^+)$ and $f_i^j \neq f_{i'}^{j'}$ if $i \neq i'$ or $j \neq j'$.

I claim:

1. In a system of orthogonal code generators having counting means comprised of a running counter for generating a running count, and code generators for generating respective code sequences in response to the count, the improvement comprising: a plurality of m orthogonal code generators j (j=1, ..., m) each comprised of Q counter-reading directed subcode generators i (i=1, ..., Q) each generating a respective subcode which together represent the code sequence, wherein a subcode generator subsequently generates subcode-representing numbers $g_i$, where $g_i \leq N_i - 1$ and $N_i$ represents a fixed value and a subcode generator is comprised of a pseudo-random generator and an adder unit, the pseudo-random generator generating from the running counter reading and a key S, a pseudo-random sequence of numbers which are supplied to the adder unit, and the adder unit adding a number $A_i$ modulo-$N_i$ to the second-last-mentioned numbers to obtain the numbers $g_i$.

2. System of orthogonal code generators as claimed in claim 1, characterised in that the system comprises $N_1 \times N_2 \times \ldots \times N_n$ code generators, where $N_1 \times N_2 \times \ldots \times N_n$ subcode generators i are embodied in $N_i$ different types by applying respectively $N_i$ different addition numbers $A_i \leq N_i - 1$ for a set of $N_1 \times N_2 \times \ldots \times N_{i-1} \times N_{i+1} \times \ldots \times N_n$ subcode generators i and where each combination of a type of subcode generators i with a type of subcode generators i−1 in one code generator, occurs for $N_1 \times N_2 \times \ldots \times N_{i-2} \times N_{i+1} \times \ldots \times N_n$ code generators.

3. System of orthogonal code generators as claimed in claim 2, characterised in that each set of $N_i \times N_{i+1} \times \ldots \times N_n$ subcode generators k of the same type (k=1, 2, ..., i−1) have the same code-sequence-determining key for subcode generator i.

4. System of orthogonal code generators as claimed in claim 1, 2 or 3, characterised in that a subcode generator i, generating numbers $g_i \leq N_i$, is provided with $a_i$ radix $q_i$ digit positions for generating the number $g_i$, where $N_i \leq q_i^{a_i}$.

5. System of orthogonal code generators as claimed in claim 4, characterised in that $q_i = q$ for all subcode generators i.

6. System of orthogonal code generators as claimed in claim 5, characterised in that, in a number of sets of $$q^{\left(\sum_{p=i-1}^{n} a_p\right)}$$

code generators, which are provided with subcode generators i−1 having the same key, subcode generators i−1 are combined with subcode generators i, where the combined subcode generators are provided with the same key and with $q^{(a_{i-1} + a_i)}$ mutually different addition numbers of $(a_{i-1} + a_i)$ digit positions.

7. System of orthogonal code generators as claimed in claim 5, characterised in that, in a number of sets of $$q^{\left(\sum_{p=i}^{n} a_p\right)}$$

code generators having the same key for subcode generators i, a number of corresponding digit positions is fixed.

8. System of orthogonal code generators as claimed in claim 5, characterised in that, in a number of sets of $q\left(\sum_{p=i}^{n} a_p\right)$ code generators having the same key for subcode generators i, subcode generators i of the set are replaced by r subsubcode generators i' (i'=1, ..., r), where subsubcode generators i' have mutually the same key and different addition numbers.

9. System of orthogonal code generators as claimed in claim 5, characterised in that, in a number of sets of $q\left(\sum_{p=i+1}^{n} a_p\right)$ code generators provided with code generators i having mutually the same key and code generators i+1 having mutually the same key, subcode generators i of the set are replaced by subcode generators i' having $a_i$ digit positions and mutually different addition numbers, and subcode generators i+1 of the set have been replaced by subcode generators i+1' having $a_{i+1}'$ digit positions and mutually different addition numbers, where $a_i + a_{i+1} = a_i' + a_{i+1}'$.

10. System of orthogonal code generators as claimed in claim 5, characterised in that, in a number of sets of $q\left(\sum_{p=i}^{n} a_p\right)$ code generators having mutually the same keys at level i, subcode generators i of the set are replaced by subcode generators i' having mutually the same key, $a_i'$ digit positions, and mutually different addition numbers.

11. Radio, provided with a code generator as claimed in claim 1, 2 or 3, where the output signals of the code generator are supplied to a memory with the purpose of addressing memory positions, a memory position comprising a frequency-representing value, which value is supplied to a transmitting and receiving unit to tune this unit to the last-mentioned frequency value, where the radio operates in a frequency band having $f_l$ as the lowest frequency and $f_h$ as the highest frequency and where the memory consists of $N_1 \times N_2 \times \ldots \times N_n = Q$ memory positions, comprising the frequency values $f_1, f_2, \ldots, f_Q$ respectively, while $f_{i-1}f_i = (f_h - f_l)/Q$ for $i = 1, 2, \ldots, Q-1$.

12. Radio provided with a code generator as claimed in claim 1, 2 or 3, where the output signals of the code generator are supplied to a memory with the purpose of addressing memory positions, a memory position comprising a frequency-representing value, which value is supplied to a transmitting and receiving unit to tune this unit to the last-mentioned frequency value, where the radio operates in a frequency band having $f_1$ as the lowest frequency and $f_h$ as the highest frequency, and where the memory consists of $N_1 \times N_2 \times \ldots \times N_n = Q$ memory positions, comprising the frequency values $f_1^1, f_2^1, \ldots, f_{Q/N_1}^1, f_1^2, f_2^2, \ldots, f_{Q/N_1}^2, \ldots, f_1^{N_1}, f_2^{N_1}, \ldots,$ $f_{Q/N_1}^{N_1}$ respectively, while $f_1 + (j-1)\frac{f_h - f_1}{N_1} < f_i^j <$ $$f_1 + j \cdot \frac{f_h - f_1}{N_1}$$

and $i = 1, 2, \ldots, Q/N_1, j = 1, 2, \ldots, N_1$.

13. Radio provided with a code generator as claimed in claim 1, 2 or 3, where the output signals of the code generator are supplied to a memory with the purpose of addressing memory positions, a memory position comprising a frequency-representing value, which value is supplied to a transmitting and receiving unit to tune this unit to the last-mentioned frequency value, where the memory consists of $N_1 \times N_2 \times \ldots \times N_n = Q$ memory positions, comprising the frequency values $f_1^1, f_2^1, \ldots, f_{k_2}^1, f_1^2, f_2^2, \ldots, f_{k_2}^2, \ldots, f_1^{Q/k_1k_2},$
$f_2^{Q/k_1k_2}, \ldots, f_{k_2}^{Q/k_1k_2},$ $f_{1+k_2}^1, f_{2+k_2}^1, \ldots, f_{2k_2}^1, f_{1+k_2}^2, f_{2+k_2}^2, \ldots, f_{2k_2}^2, \ldots, f_{1+k_2}^{Q/k_1k_2},$
$f_{2+k_2}^{Q/k_1k_2}, \ldots, f_{2k_2}^{Q/k_1k_2},$ $f_{1+2k_2}^1, f_{2+2k_2}^1, \ldots, f_{3k_2}^1, f_{1+2k_2}^2, f_{2+2k_2}^2, \ldots, f_{3k_2}^2, \ldots, f_{1+2k_2}^{Q/k_1k_2},$
$f_{2+2k_2}^{Q/k_1k_2}, \ldots, f_{3k_2}^{Q/k_1k_2},$ $\cdot$
$\cdot$
$\cdot$ $f_{1+(k_1-1)k_2}^1, f_{2+(k_1-1)k_2}^1, \ldots, f_{k_1k_2}^1, f_{1+(k_1-1)k_2}^2, f_{2+(k_1-1)k_2}^2, \ldots,$
$f_{k_1k_2}^2, \ldots, f_{1+(k_1-1)k_2}^{Q/k_1k_2}, f_{2+(k_1-1)k_2}^{Q/k_1k_2}, \ldots, f_{k_1k_2}^{Q/k_1k_2}$ respectively, while $|f_i^j - f_{i'}^j| \geq \Delta \cdot f_i^j$ ($j = 1, 2, \ldots, Q/k_1k_2$; $i, i' = 1, 2, \ldots, k_1k_2 \wedge i \neq i'$; $\Delta > 0$; $k_1k_2 \in N^+$) and $f_i^j \neq f_{i'}^{j'}$ if $i \neq i$ of $j \neq j$.

14. Radio as claimed in claim 13, characterised in that the radio operates in a frequency band B with $f_l < B < f_h$, where $$k_1 k_2 \leq \left| \frac{\log f_h - \log f_1}{\log (1 - \Delta)} \right|.$$

* * * * *